US012293862B2

(12) United States Patent
Ito et al.

(10) Patent No.: US 12,293,862 B2
(45) Date of Patent: May 6, 2025

(54) MOTOR-DRIVEN COMPRESSOR

(71) Applicant: KABUSHIKI KAISHA TOYOTA JIDOSHOKKI, Aichi-ken (JP)

(72) Inventors: Shun Ito, Kariya (JP); Kazuhiro Shiraishi, Kariya (JP); Yoshiki Nagata, Kariya (JP); Takashi Kawashima, Kariya (JP); Hiroshi Fukasaku, Kariya (JP); Shunsuke Ambo, Kariya (JP)

(73) Assignee: KABUSHIKI KAISHA TOYOTA JIDOSHOKKI, Aichi-Ken (JP)

( * ) Notice: Subject to any disclaimer, the term of this patent is extended or adjusted under 35 U.S.C. 154(b) by 64 days.

(21) Appl. No.: 18/383,139

(22) Filed: Oct. 24, 2023

(65) Prior Publication Data

US 2024/0145152 A1 May 2, 2024

(30) Foreign Application Priority Data

Oct. 31, 2022 (JP) ................. 2022-174125

(51) Int. Cl.
*H01F 17/06* (2006.01)
*H01F 27/29* (2006.01)
*H02M 1/12* (2006.01)

(52) U.S. Cl.
CPC ......... *H01F 17/062* (2013.01); *H01F 27/292* (2013.01); *H02M 1/123* (2021.05)

(58) Field of Classification Search
CPC ........... H01F 17/062; H01F 2017/0093; H01F 27/2895; H01F 27/292; H01F 27/346; H01F 37/00; H02M 1/123; H02M 7/003
See application file for complete search history.

(56) References Cited

U.S. PATENT DOCUMENTS

2021/0090776 A1\* 3/2021 Fukasaku ............ F04C 29/0085
2021/0320566 A1\* 10/2021 Yamamoto ............... H02K 5/06

FOREIGN PATENT DOCUMENTS

JP 2021-168561 A 10/2021

\* cited by examiner

*Primary Examiner* — Naishadh N Desai
(74) *Attorney, Agent, or Firm* — Greenblum & Bernstein, P.L.C.

(57) ABSTRACT

A motor-driven compressor includes an inverter device. The inverter device includes a common mode choke coil. The common mode choke coil includes an annular core, two windings wound around the core, and an annular conductor that covers the two windings. The conductor is divided into a first metal plate and a second metal plate, which are combined to form an annular shape such that induced current flows in a circumferential direction of the conductor so as to hinder changes in leakage magnetic flux from the core. The second metal plate is thermally connected to the housing. The first metal plate is thermally connected to the second metal plate. At least one of an electrical resistance value or a thermal resistance value in a current path of the induced current is lower in the second metal plate than in the first metal plate.

4 Claims, 4 Drawing Sheets

MOTOR-DRIVEN COMPRESSOR

BACKGROUND

1. Field

The present disclosure relates to a motor-driven compressor.

2. Description of Related Art

A motor-driven compressor includes a compression unit, a motor, and an inverter device. The compression unit compresses a fluid. The motor drives the compression unit. The inverter device is accommodated in a metal housing. The inverter device drives the motor.

The inverter device includes an inverter circuit, a noise reducing unit, and a circuit board. The inverter circuit converts DC power into AC power. The noise reducing unit is arranged on the input side of the inverter circuit. The noise reducing unit reduces common-mode noise and normal-mode noise included in the DC power input to the inverter circuit. The inverter circuit and the noise reducing unit are mounted on the circuit board. The noise reducing unit includes a common mode choke coil and a smoothing capacitor. The smoothing capacitor forms a low-pass filter together with the common mode choke coil.

The common mode choke coil includes an annular core, two windings, and an annular conductor. The two windings are wound around the core. The conductor covers both of the two windings.

For example, Japanese Laid-Open Patent Publication No. 2021-168561 discloses a conductor that is divided into a first metal plate and a second metal plate. The first metal plate and the second metal plate are combined to form an annular shape such that induced current flows in a circumferential direction of the conductor so as to hinder changes in leakage magnetic flux from the core.

In the configuration disclosed in the above-described publication, the first metal plate includes a main body and two upright portions extending from opposite ends of the main body in a direction orthogonal to the main body. The second metal plate includes a main body and two upright portions extending from opposite ends of the main body in a direction orthogonal to the main body. The two upright portions of the second metal plate are provided between the two upright portions of the first metal plate. The upright portions of the first metal plate and the upright portions of the second metal plate are welded to each other.

In the above-described publication, the electrical resistance value of the first metal plate is greater than the electrical resistance value of the second metal plate. Thus, for example, due to the heat generated by the induced current flowing through the welded portions and the heat generated by the induced current flowing through the second metal plate, the second metal plate tends to retain heat. It is therefore desired that the heat of the second metal plate be dissipated to the housing.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a motor-driven compressor includes a compression unit configured to compress a fluid, a motor configured to drive the compression unit, and an inverter device accommodated in a metal housing, the inverter device being configured to drive the motor. The inverter device includes an inverter circuit configured to convert DC power to AC power, a noise reducing unit that is provided on an input side of the inverter circuit and is configured to reduce common-mode noise and normal-mode noise included in the DC power before the DC power is supplied to the inverter circuit, and a circuit board on which the inverter circuit and the noise reducing unit are mounted. The noise reducing unit includes a common mode choke coil and a smoothing capacitor that forms a low-pass filter together with the common mode choke coil. The common mode choke coil includes an annular core, two windings wound around the core, and an annular conductor that covers both of the two windings. The conductor is divided into a first metal plate and a second metal plate. The first metal plate and the second metal plate are combined to form an annular shape such that induced current flows in a circumferential direction of the conductor so as to hinder changes in leakage magnetic flux from the core. The circuit board is disposed on an opposite side of the common mode choke coil from the housing. The second metal plate includes a main body disposed on an opposite side of the two windings from the first metal plate and two extending portions that extend from the main body toward the housing. The second metal plate is thermally connected to the housing. The first metal plate is thermally connected to the second metal plate. At least one of an electrical resistance value or a thermal resistance value in a current path of the induced current is lower in the second metal plate than in the first metal plate.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, except for operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

A motor-driven compressor 11 according to one embodiment will now be described with reference to FIGS. 1 to 4. The motor-driven compressor 11 of the present embodiment is used, for example, in a vehicle air conditioner 10.

Vehicle Air Conditioner 10

Figure 1:
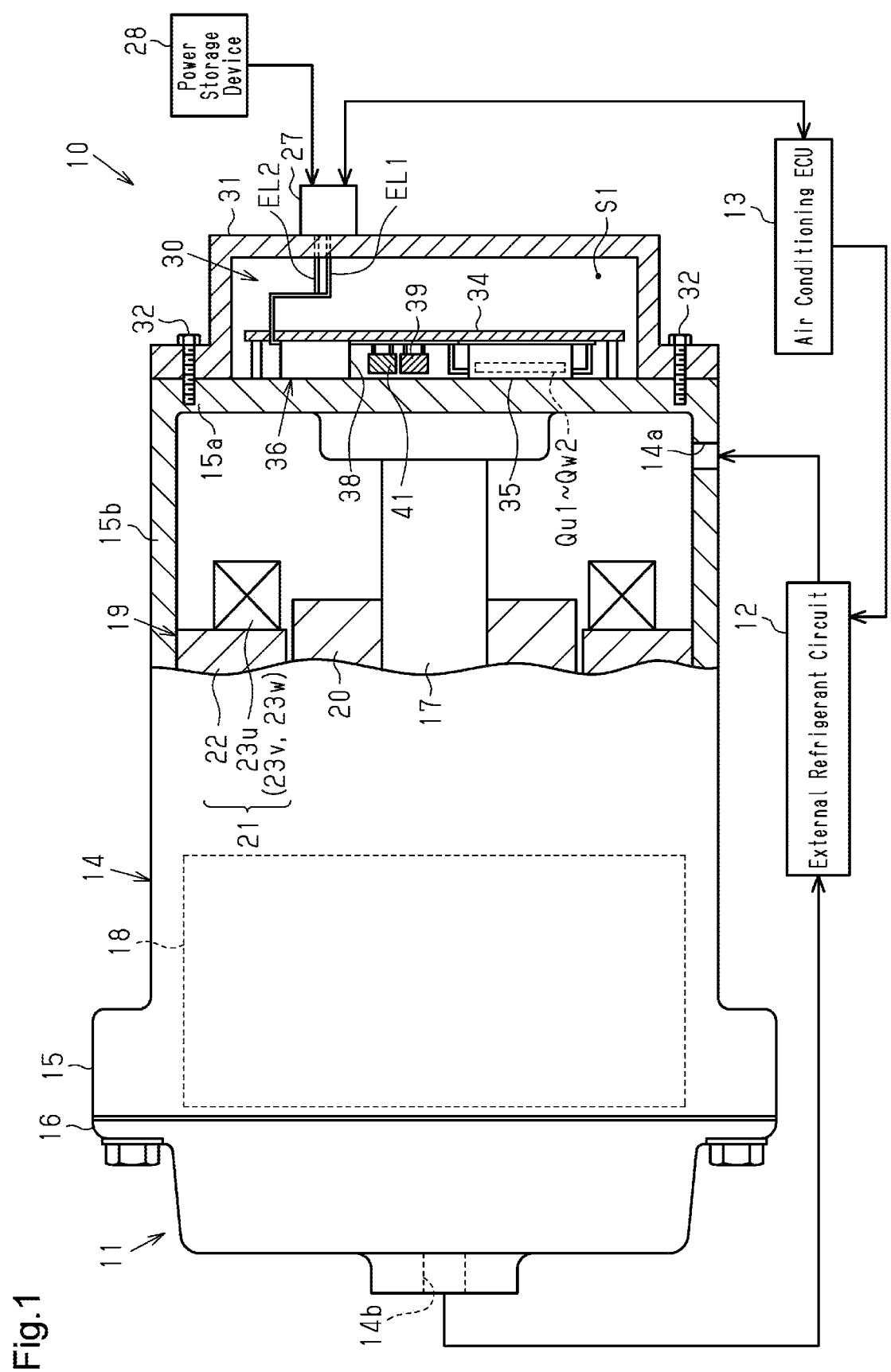
FIG. 1 is a cross-sectional side view of a motor-driven compressor according to an embodiment.

As shown in FIG. 1, the vehicle air conditioner 10 includes the motor-driven compressor 11 and an external refrigerant circuit 12. The external refrigerant circuit 12 supplies fluid, which is refrigerant, to the motor-driven compressor 11. The external refrigerant circuit 12 includes, for example, a heat exchanger and an expansion valve. The motor-driven compressor 11 compresses the refrigerant. Also, the external refrigerant circuit 12 performs heat exchange of the refrigerant and expands the refrigerant. This allows the vehicle air conditioner 10 to cool or warm the passenger compartment.

The vehicle air conditioner 10 includes an air conditioning ECU 13. The air conditioning ECU 13 controls the entire vehicle air conditioner 10. The air conditioning ECU 13 is configured to obtain parameters such as the temperature in the passenger compartment and a target temperature of a car air conditioner. Based on parameters such as the temperature in the passenger compartment and the target temperature of the car air conditioner, the air conditioning ECU 13 outputs various commands such as ON-OFF commands to the motor-driven compressor 11.

Basic Configuration of Motor-Driven Compressor 11

The motor-driven compressor 11 includes a housing 14. The housing 14 is made of a thermally conductive metal, such as aluminum. The housing 14 is thus made of metal. The housing 14 is grounded to the body of the vehicle.

The housing 14 includes a suction housing member 15 and a discharge housing member 16. The suction housing member 15 and the discharge housing member 16 are coupled to each other. The suction housing member 15 includes a plate-shaped end wall 15a and a tubular peripheral wall 15b. The peripheral wall 15b extends from the outer periphery of the end wall 15a. The discharge housing member 16 is attached to the suction housing member 15 while closing the opening of the suction housing member 15. Accordingly, an internal space is defined in the housing 14.

The housing 14 includes a suction port 14a. Refrigerant is drawn into the suction port 14a from the external refrigerant circuit 12. The refrigerant is thus drawn into the housing 14. The suction port 14a is provided in the peripheral wall 15b of the suction housing member 15. The suction port 14a is formed in a part of the peripheral wall 15b of the suction housing member 15 at a position closer to the end wall 15a than to the discharge housing member 16. The housing 14 includes a discharge port 14b. The discharge port 14b discharges refrigerant to the external refrigerant circuit 12. The discharge port 14b is formed in the discharge housing member 16.

The motor-driven compressor 11 includes a rotary shaft 17, a compression unit 18, and a motor 19. The rotary shaft 17, the compression unit 18, and the motor 19 are accommodated in the housing 14. The rotary shaft 17 is rotatably supported by the housing 14. The rotary shaft 17 is disposed in the housing 14 such that the axial direction of the rotary shaft 17 agrees with the axial direction of the peripheral wall 15b.

The compression unit 18 is accommodated in the suction housing member 15. The compression unit 18 is, for example, of a scroll type and includes a fixed scroll (not shown) fixed in the suction housing member 15 and an orbiting scroll (not shown) arranged to be opposed to the fixed scroll. The compression unit 18 is disposed in the suction housing member 15 at a position closer to the discharge port 14b than to the suction port 14a. The compression unit 18 is coupled to the rotary shaft 17. The compression unit 18 is driven by rotation of the rotary shaft 17 to compress the refrigerant.

The motor 19 is accommodated in the suction housing member 15. The motor 19 is disposed in the suction housing member 15 between the compression unit 18 and the end wall 15a. The motor 19 includes a rotor 20 and a stator 21. The stator 21 includes a cylindrical stator core 22, a u-phase coil 23u, a v-phase coil 23v, and a w-phase coil 23w.

The u-phase coil 23u, the v-phase coil 23v, and the w-phase coil 23w are respectively wound around the stator core 22. The u-phase coil 23u, the v-phase coil 23v, and the w-phase coil 23w are connected to form a Y-connection, for example. The manner in which the u-phase coil 23u, the v-phase coil 23v, and w-phase coil 23w are connected together is not limited to a Y-connection. The manner in which the u-phase coil 23u, the v-phase coil 23v, and the w-phase coil 23w may be, for example, a delta connection.

The rotor 20 is cylindrical. The rotor 20 is fixed to the rotary shaft 17. The rotary shaft 17 is thus configured to rotate integrally with the rotor 20. The stator 21 is fixed to the peripheral wall 15b of the suction housing member 15. The rotor 20 and the stator 21 are opposed to each other in the radial direction of the rotary shaft 17.

The rotor 20 rotates when the u-phase coil 23u, the v-phase coil 23v, and the w-phase coil 23w are energized in a specified pattern. The rotary shaft 17 rotates as the rotor 20 rotates. This drives the compression unit 18. The motor 19 thus drives the compression unit 18. The refrigerant that flows through the external refrigerant circuit 12 is drawn into the housing 14 through the suction port 14a. The compression unit 18 compresses the refrigerant that has been drawn into the housing 14. The compressed refrigerant is discharged to the external refrigerant circuit 12 through the discharge port 14b.

The motor-driven compressor 11 includes an inverter device 30. The inverter device 30 drives the motor 19. The housing 14 includes an inverter cover 31. The inverter cover 31 is made of metal such as aluminum. The inverter cover 31 is attached to the end wall 15a of the suction housing member 15 with bolts 32. The end wall 15a of the suction housing member 15 and the inverter cover 31 define an inverter accommodating chamber S1. The inverter device 30 is accommodated in the inverter accommodating chamber S1. The inverter device 30 is thus accommodated in the metal housing 14.

The motor-driven compressor 11 includes a connector 27. The connector 27 is electrically connected to a power storage device 28 mounted on the vehicle. The connector 27 is arranged on the inverter cover 31. The connector 27 protrudes from the inverter cover 31. The power storage device 28 is a power supply that supplies electric power to devices mounted on the vehicle. The power storage device 28 is a DC power supply. The power storage device 28 is, for example, a rechargeable battery or a capacitor.

The inverter device 30 incudes a circuit board 34. The circuit board 34 is accommodated in the inverter accommodating chamber S1. The circuit board 34 is disposed to face the end wall 15a at a specified distance in the axial direction of the rotary shaft 17. The circuit board 34 is accommodated in the inverter accommodating chamber S1 with the thickness direction of the circuit board 34 agreeing with the axial direction of the rotary shaft 17.

The inverter device 30 includes an inverter circuit 35 and a noise reducing unit 36. The inverter circuit 35 converts DC power into AC power. The noise reducing unit 36 is arranged on the input side of the inverter circuit 35. The input side of the inverter circuit 35, for example, refers to a position located between the inverter circuit 35 and the power storage device 28. The noise reducing unit 36 reduces common-mode noise and normal-mode noise included in the DC power before being input to the inverter circuit 35. The inverter circuit 35 and the noise reducing unit 36 are mounted on the circuit board 34. The housing 14 thus accommodates the inverter circuit 35 and the noise reducing unit 36.

Inverter Circuit 35.

Figure 2:
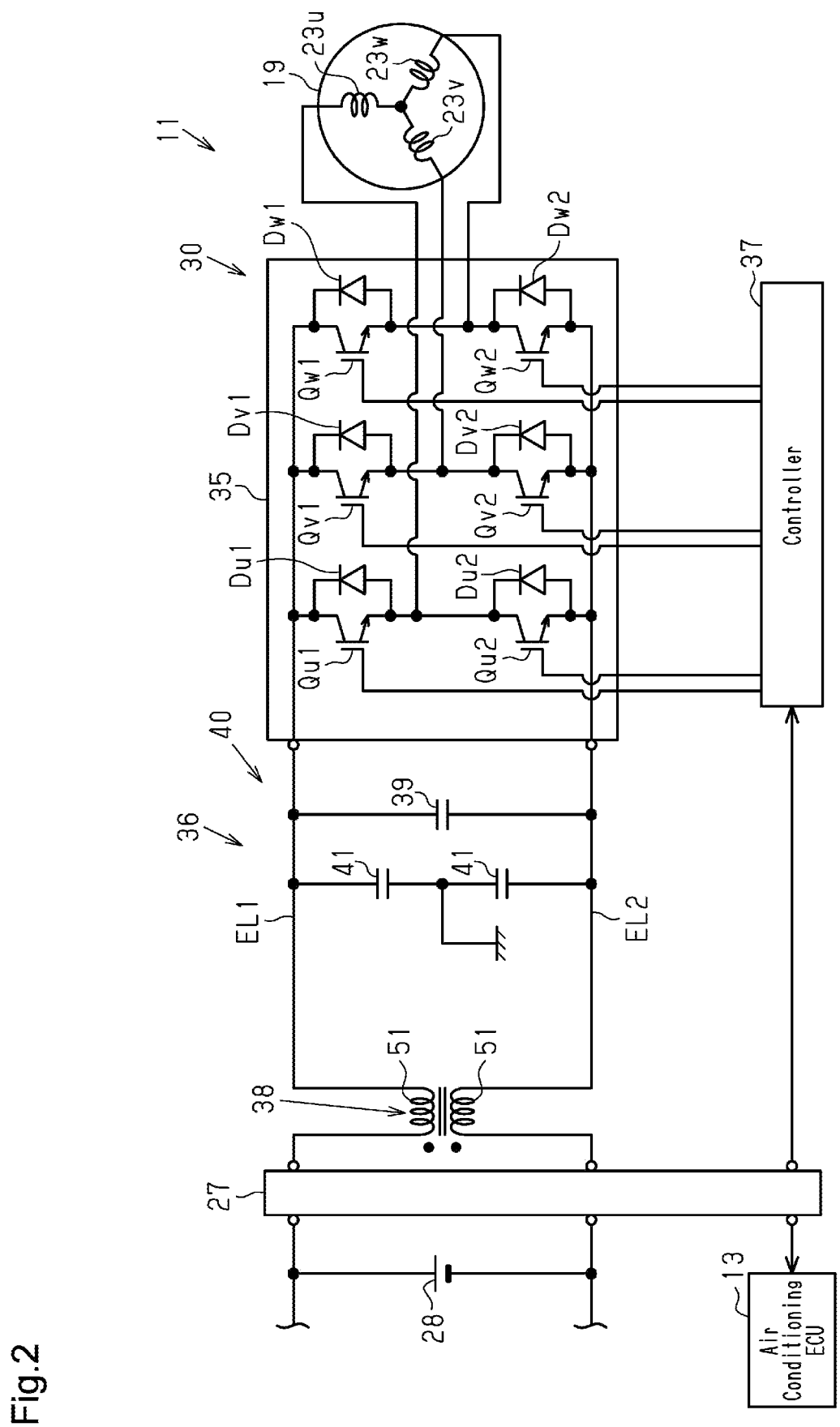
FIG. 2 is a circuit diagram showing the electrical configuration of the motor-driven compressor shown in FIG. 1.

As shown in FIG. 2, the inverter circuit 35 includes two connection lines EL1, EL2. The inverter circuit 35 includes two u-phase switching elements Qu1, Qu2, which correspond to the u-phase coil 23u. The inverter circuit 35 includes two v-phase switching elements Qv1, Qv2, which correspond to the v-phase coil 23v. The inverter circuit 35 includes two w-phase switching elements Qw1, Qw2, which correspond to the w-phase coil 23w. The switching elements Qu1 to Qw2 are each, for example, a power switching element such as an insulated gate bipolar transistor (IGBT). The switching elements Qu1, Qu2, Qv1, Qv2, Qw1, and Qw2 are respectively connected to freewheeling diodes Du1, Du2, Dv1, Dv2, Dw1, and Dw2.

The u-phase switching elements Qu1, Qu2 are connected in series to form a serially-connected body. The connecting point between the u-phase switching elements Qu1, Qu2 is connected to the u-phase coil 23u. The serially-connected body including the u-phase switching elements Qu1, Qu2 is electrically connected to the connection lines EL1, EL2.

The v-phase switching elements Qv1, Qv2 are connected in series to form a serially-connected body. The connecting point between the v-phase switching elements Qv1, Qv2 is connected to the v-phase coil 23v. The serially-connected body including the v-phase switching elements Qv1, Qv2 is electrically connected to the connection lines EL1, EL2.

The w-phase switching elements Qw1, Qw2 are connected in series to form a serially-connected body. The connecting point between the w-phase switching elements Qw1, Qw2 is connected to the w-phase coil 23w. The serially-connected body including the w-phase switching elements Qw1, Qw2 is electrically connected to the connection lines EL1, EL2.

The inverter device 30 includes a controller 37, which is processing circuitry. The controller 37 controls switching operations of the switching elements Qu1 to Qw2. The controller 37 may include, for example, at least one dedicated hardware circuit and/or at least one processor (control circuit) that operates in accordance with a computer program (software). The processor includes a CPU and a memory such as a RAM and a ROM. The memory stores program codes or commands configured to cause the processor to execute various processes. The memory, or a computer-readable medium, includes any type of medium that is accessible by a general-purpose computer or a dedicated computer.

The controller 37 is electrically connected to the air conditioning ECU 13 via the connector 27. Based on commands from the air conditioning ECU 13, the controller 37 periodically turns on and off the switching elements Qu1 to Qw2. Specifically, based on commands from the air conditioning ECU 13, the controller 37 performs pulse width modulation control (PWM control) on the switching elements Qu1 to Qw2. More specifically, the controller 37 uses a carrier signal (carrier wave signal) and a commanded voltage value signal (signal for comparison) to generate control signals. The controller 37 performs ON-OFF control of the switching elements Qu1 to Qw2 by using the generated control signals, thereby converting DC power to AC power.

Noise Reducing Unit 36

The noise reducing unit 36 includes a common mode choke coil 38 and a smoothing capacitor 39. The smoothing capacitor 39 forms a low-pass filter 40 together with the common mode choke coil 38. The low-pass filter 40 is provided on the connection lines EL1, EL2. The low-pass filter 40 is provided between the connector 27 and the inverter circuit 35 in the circuit structure. The common mode choke coil 38 are provided on the connection lines EL1, EL2.

The smoothing capacitor 39 is located between the common mode choke coils 38 and the inverter circuit 35. The smoothing capacitor 39 is an X capacitor, which is connected in parallel with the inverter circuit 35. The smoothing capacitor 39 is electrically connected to the connection lines EL1, EL2. The common mode choke coils 38 and the smoothing capacitor 39 form an LC resonance circuit. Thus, the low-pass filter 40 of the present embodiment is an LC resonance circuit including the common mode choke coil 38. The noise reducing unit 36 includes two Y-capacitors 41. The two Y-capacitors 41 are connected in series. The connecting point between the two Y-capacitors 41 is grounded to the body of the vehicle via the housing 14. The two Y-capacitors 41 are arranged between the common mode choke coil 38 and the inverter circuit 35. The two Y-capacitors 41 are connected in parallel with the common mode choke coil 38. The two Y-capacitors 41 are connected in parallel with the smoothing capacitor 39. The two Y-capacitors 41 are arranged between the common mode choke coil 38 and the smoothing capacitor 39.

The common mode choke coil 38 limits transmission of high frequency noise generated in the vehicle to the inverter circuit 35 of the motor-driven compressor 11. The common mode choke coil 38 uses the leakage inductance as a normal inductance. Accordingly, the common mode choke coil 38 is used as an L component in the low-pass filter (LC filter) 40, which eliminates normal-mode noise (differential-mode noise). That is, the common mode choke coil 38 can cope with the common mode noise and the normal mode noise (differential mode noise). In other words, the motor-driven compressor 11 of the present embodiment uses the common mode choke coil 38 to cope with common-mode noise and normal-mode noise (differential-mode noise), instead of using a choke coil for common mode and another choke coil for normal mode (differential mode).

Common Mode Choke Coil 38

Figure 3:
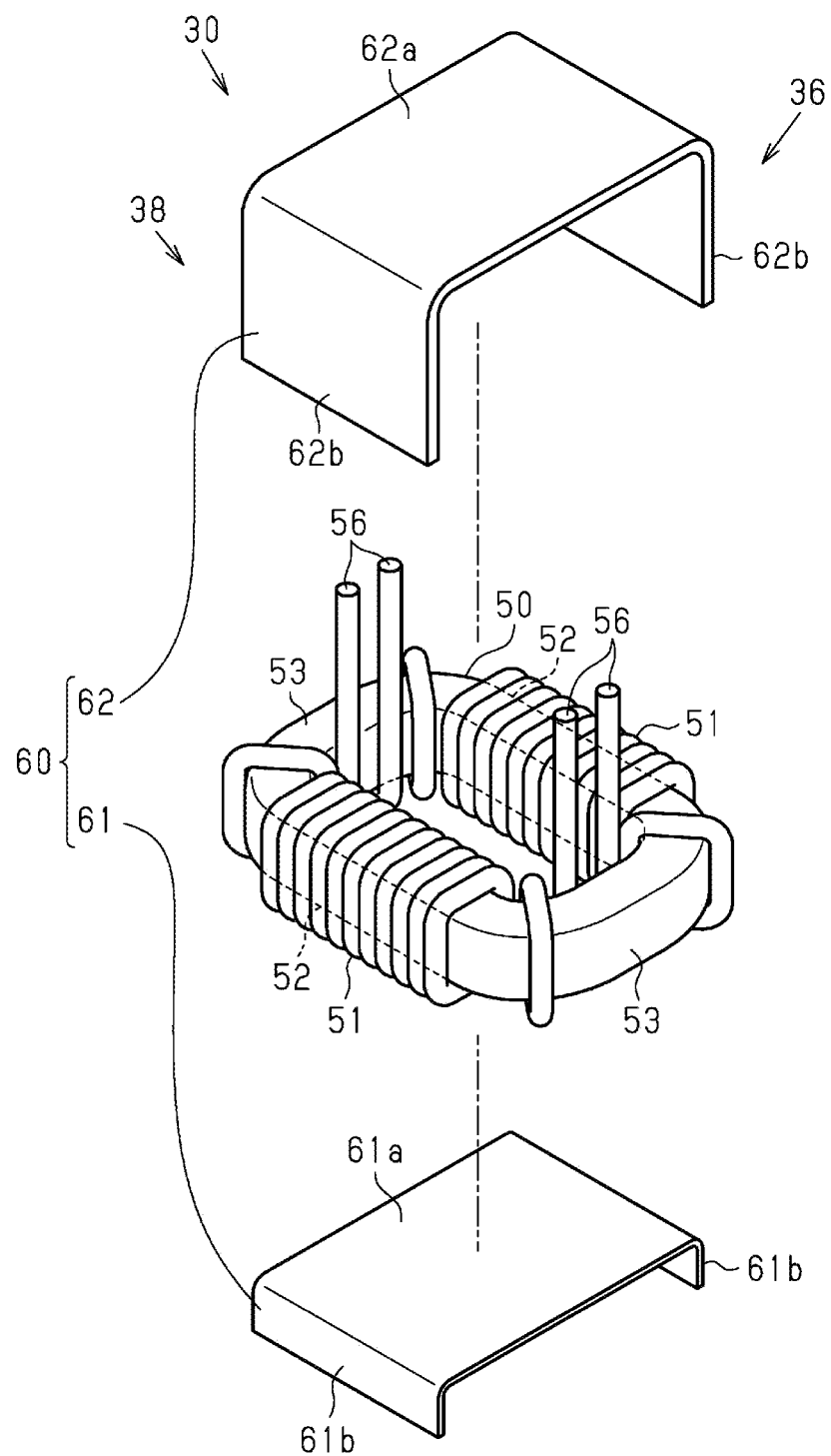
FIG. 3 is an exploded perspective view of a common mode choke coil included in the motor-driven compressor shown in FIG. 1.

As shown in FIG. 3, the common mode choke coil 38 includes a core 50 and two windings 51. The core 50 is annular. The core 50 is made of a ferromagnetic material. The core 50 includes, for example, a ferrite core. The core 50 includes two straight portions 52 and two coupling portions 53.

Each straight portion 52 has, for example, a shape of a quadrangular prism. The straight portions 52 extend parallel with each other. The straight portions 52 are arranged such that the directions in which the axes of the straight portions 52 extend agree with each other. The two straight portions 52 face each other and are separated from each other. The windings 51 are respectively wound around the straight portions 52. The windings 51 are wound around the core 50. The windings 51 face each other.

Each coupling portion 53 has, for example, a shape of a quadrangular prism. One of the two coupling portions 53 couples first ends of the straight portions 52 to each other. The other one of the two coupling portions 53 couples second ends of the straight portions 52 to each other. Each winding 51 is partly wound around the coupling portions 53. A plastic member (not shown) is provided between the core 50 and each winding 51 to ensure insulation between the core 50 and each winding 51.

Figure 4:
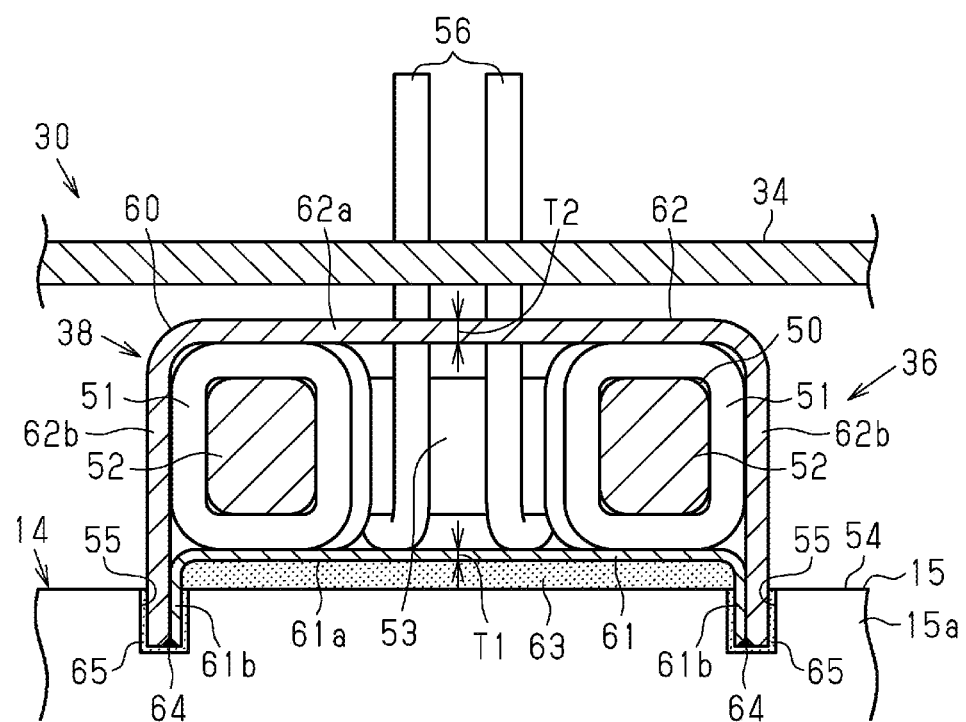
FIG. 4 is a cross-sectional view showing part of the motor-driven compressor shown in FIG. 1.

As shown in FIG. 4, the common mode choke coil 38 is arranged between the circuit board 34 and the end wall 15a of the suction housing member 15. The circuit board 34 is disposed on the opposite side of the common mode choke coil 38 from the housing 14. The common mode choke coil 38 is disposed such that the direction in which the axis of each straight portion 52 extends is orthogonal to the direction in which the circuit board 34 and the end wall 15a of the suction housing member 15 face each other.

The common mode choke coil 38 is mounted on the outer surface of the end wall 15a of the suction housing member 15. Thus, the outer surface of the end wall 15a of the suction housing member 15 is a mounting surface 54 on which the common mode choke coil 38 is mounted. The common mode choke coil 38 is mounted on the mounting surface 54 of the housing 14. The mounting surface 54 includes two recesses 55.

As shown in FIG. 3, the opposite ends of each winding 51 are drawn out as lead portions 56 from the coupling portions 53. As shown in FIG. 4, each lead portion 56 is, for example, soldered to the circuit board 34. This electrically connects the common mode choke coil 38 to the circuit board 34.

As shown in FIGS. 3 and 4, the common mode choke coil 38 includes a conductor 60. The conductor 60 is annular and covers both of the two windings 51. Specifically, the conductor 60 covers parts of the two windings 51 that are wound around the straight portions 52. A plastic member (not shown) is provided between the conductor 60 and each winding 51 to ensure insulation between the conductor 60 and each winding 51.

The conductor 60 includes a first metal plate 61 and a second metal plate 62. The conductor 60 is divided into the first metal plate 61 and the second metal plate 62. The first metal plate 61 and the second metal plate 62 are combined to form an annular shape. The first metal plate 61 is made of, for example, copper. The second metal plate 62 is made of, for example, phosphor bronze. Thus, the second metal plate 62 is made of a material having a higher thermal conductivity than that of the first metal plate 61.

The first metal plate 61 has a constant thickness T1. The second metal plate 62 has a constant thickness T2. The thickness T1 of the first metal plate 61 is less than the thickness T2 of the second metal plate 62. Therefore, the cross-sectional area in the thickness direction of the first metal plate 61 is smaller than the cross-sectional area in the thickness direction of the second metal plate 62.

The first metal plate 61 includes a first metal plate main body 61a and two upright portions 61b. The first metal plate main body 61a has a shape of a rectangular flat plate. Each upright portion 61b has a shape of a rectangular flat plate. The upright portions 61b extend from the opposite edges in the longitudinal direction of the first metal plate main body 61a to be erect in relation to the first metal plate main body 61a. Thus, the two upright portions 61b extend from the first metal plate main body 61a so as to intersect, or be orthogonal to, the first metal plate main body 61a. The direction in which each upright portion 61b extends from the first metal plate main body 61a agrees with the thickness direction of the first metal plate main body 61a. The two upright portions 61b extend in parallel. The two upright portions 61b extend from the first metal plate main body 61a toward the suction housing member 15. The upright portions 61b thus extend toward the housing 14. The width of the first metal plate main body 61a is equal to the width of each upright portion 61b. The width is the dimension of the first metal plate main body 61a in the direction in which its short sides extend. The first metal plate 61 is formed by pressing a single metal plate.

As shown in FIG. 4, the first metal plate main body 61a is joined to the mounting surface 54 with adhesive 63. The first metal plate main body 61a is thermally connected to the mounting surface 54 with the adhesive 63. Thus, the first metal plate 61 is thermally connected to the mounting surface 54. Thermal connection includes a case in which two members are directly connected to each other and a case in which two members are indirectly connected to each other with a member having a higher thermal conductivity than air. The first metal plate main body 61a covers parts of the two windings 51 that face the mounting surface 54. Thus, the first metal plate 61 covers the parts of the two windings 51 that face the mounting surface 54.

As shown in FIGS. 3 and 4, the second metal plate 62 includes a second metal plate main body 62a, which is a main body, and two extending portions 62b. The second metal plate main body 62a has a shape of a rectangular flat plate. Each extending portion 62b has a shape of a rectangular flat plate. As shown in FIG. 4, the two extending portions 62b extend from the second metal plate main body 62a toward the end wall 15a of the suction housing member 15. The extending portions 62b extend from the opposite edges in the longitudinal direction of the second metal plate main body 62a. Thus, the extending portions 62b extend from the second metal plate main body 62a so as to intersect, or be orthogonal to, the second metal plate main body 62a. The direction in which each extending portion 62b extends from the second metal plate main body 62a agrees with the thickness direction of the second metal plate main body 62a. The two extending portions 62b extend in parallel. The width of the second metal plate main body 62a is equal to the width of each extending portion 62b. The width of the second metal plate main body 62a is equal to the width of the first metal plate main body 61a. The width of each extending portion 62b is equal to the width of each upright portion 61b. The width is the dimension of the second metal plate main body 62a in the direction in which its short sides extend. The second metal plate 62 is formed by pressing a single metal plate.

The second metal plate main body 62a covers parts of the two windings 51 that are on a side opposite from the mounting surface 54. Thus, the second metal plate 62 covers the parts of the two windings 51 that are on the sides opposite from the mounting surface 54. The second metal plate main body 62a is disposed on an opposite side of the two windings 51 from the first metal plate 61. The two extending portions 62b respectively cover parts of the two windings 51 that are on the sides opposite from the parts that are adjacent to each other.

The first metal plate 61 is provided between the two extending portions 62b. Each of the distal ends of the two extending portions 62b faces the corresponding one of the two upright portions 61b. The distal end of each extending portion 62*b* is joined to the corresponding upright portion 61*b*. The conductor 60 thus includes joint portions 64, which each provide a metal-to-metal joint between the distal end of each extending portion 62*b* and the corresponding upright portion 61*b*. The extending portions 62*b* are welded to the upright portions 61*b*, for example, by resistance welding. Thus, the joint portions 64 are parts at which the extending portions 62*b* and the upright portions 61*b* are welded to each other.

As described above, the two extending portions 62*b* are electrically connected to the first metal plate 61. Accordingly, the first metal plate 61 is thermally connected to the second metal plate 62. The conductor 60 is formed to be band-shaped and endless by joining the distal ends of the extending portions 62*b* and the upright portions 61*b* to each other with the joint portions 64.

The distal ends of the extending portions 62*b* and the upright portions 61*b* are inserted into the recesses 55. The recesses 55 are filled with adhesive 65. The distal end of each extending portion 62*b* and the corresponding upright portion 61*b* are thermally connected to the inner surface of the corresponding recess 55 with the adhesive 65. The distal end of each extending portion 62*b* is thus inserted into the corresponding recess 55 and is thermally connected to the inner surface of the recess 55. Thus, the two extending portions 62*b* are thermally connected to the housing 14. At least the second metal plate 62 of the first metal plate 61 and the second metal plate 62 is thermally connected to the housing 14. Each upright portion 61*b* is inserted into the corresponding recess 55 and is thermally connected to the inner surface of the recess 55. Thus, the upright portions 61*b* are inserted into the recesses 55 and are thermally connected to the housing 14. The joint portions 64 are arranged inside the recesses 55 and are thermally connected to the housing 14.

Operation of Embodiment

Operation of the present embodiment will now be described.

When the two windings 51 are energized, current flows through the windings 51. This generates magnetic flux in the core 50 and also generates a leakage magnetic flux. An induced current flows in the circumferential direction inside the conductor 60 so as to generate a magnetic flux in a direction of resisting the leakage magnetic flux. The first metal plate 61 and the second metal plate 62 are combined to form an annular shape such that induced current flows in the circumferential direction of the conductor 60 so as to hinder changes in leakage magnetic flux from the core 50. In this manner, the induced current flows in the circumferential direction inside the conductor 60 so as to generate a magnetic flux in a direction of resisting the leakage magnetic fluxes generated by energization of the windings 51. The induced current flows around the core 50. The induced current in the conductor 60 is converted into thermal energy, so that the conductor 60 acts as a magnetic resistance, thereby producing a damping effect. This suppresses a resonance peak generated by the low-pass filter 40.

The conductor 60 is divided in the circumferential direction into the first metal plate 61 and the second metal plate 62. The cross-sectional area in the thickness direction of the first metal plate 61 is smaller than the cross-sectional area in the thickness direction of the second metal plate 62. Accordingly, the electrical resistance value of the first metal plate 61 is greater than the electrical resistance value of the second metal plate 62. Thus, the amount of heat generated by the first metal plate 61 is greater than that of the second metal plate 62. Therefore, the heat generated by the conductor 60 is readily concentrated on the first metal plate 61. Since the first metal plate 61 is thermally connected to the mounting surface 54, the heat generated by the first metal plate 61 is efficiently dissipated to the housing 14. As a result, the heat generated by the conductor 60 is efficiently dissipated to the housing 14.

Also, the second metal plate 62 generates heat. The heat generated by the second metal plate main body 62*a* is dissipated to the housing 14 through the extending portions 62*b*. The cross-sectional area in the thickness direction of the first metal plate 61 is smaller than the cross-sectional area in the thickness direction of the second metal plate 62. In other words, the cross-sectional area in the thickness direction of the second metal plate 62 is greater than the cross-sectional area in the thickness direction of the first metal plate 61. Therefore, at least one of the electrical resistance value or the thermal resistance value in the current path of induced current is lower in the second metal plate 62 than in the first metal plate 61. This readily ensures a heat transfer path from the second metal plate main body 62*a* to the housing 14 via the extending portions 62*b*. Particularly, the distal end of each extending portion 62*b* is inserted into the corresponding recess 55 and is thermally connected to the inner surface of the recess 55. Thus, as compared to a case in which, for example, the distal end face of each extending portion 62*b* is thermally connected to the mounting surface 54, the heat transfer path between the extending portion 62*b* and the housing 14 is increased. This allows the heat generated from the second metal plate 62 to be efficiently dissipated to the housing 14.

Advantages of Embodiment

The above-described embodiment has the following advantages.

(1) The second metal plate 62 includes the second metal plate main body 62*a* and the two extending portions 62*b*. The second metal plate main body 62*a* is disposed on an opposite side of the two windings 51 from the first metal plate 61. The two extending portions 62*b* extend from the second metal plate main body 62*a* toward the housing 14. At least the second metal plate 62 of the first metal plate 61 and the second metal plate 62 is thermally connected to the housing 14. The first metal plate 61 is thermally connected to the second metal plate 62. This dissipates the heat of the second metal plate 62 to the housing 14. At least one of the electrical resistance value or the thermal resistance value in the current path of induced current is lower in the second metal plate 62 than in the first metal plate 61. This readily ensures a heat transfer path from the second metal plate main body 62*a* to the housing 14 via the extending portions 62*b*. This efficiently dissipates the heat generated by the second metal plate 62 to the housing 14. This improves the heat dissipation of the conductor 60.

(2) The housing 14 includes the two recesses 55. The distal ends of the extending portions 62*b* are inserted into the recesses 55. This configuration increases the heat transfer path between the extending portions 62*b* and the housing 14 as compared to a case in which, for example, the distal end faces of the extending portions 62*b* are thermally connected to the mounting surface 54 of the housing 14. This further efficiently dissipates the heat generated by the second metal plate 62 to the housing 14.

(3) The first metal plate 61 includes the two upright portions 61*b*. The two upright portions 61*b* extend toward the housing 14. The upright portions 61*b* are inserted into the recesses 55 and are thermally connected to the housing 14.

In this configuration, the heat generated by the first metal plate 61 is also transferred to the inner surfaces of the recesses 55 through the upright portions 61b. This efficiently dissipates the heat generated by the first metal plate 61 to the housing 14. This further improves the heat dissipation of the conductor 60.

(4) The conductor 60 includes the joint portions 64, which each provide a metal-to-metal joint between the distal end of each extending portion 62b and the corresponding upright portion 61b. The joint portions 64 are respectively arranged inside the recesses 55 and are thermally connected to the housing 14. This allows the heat generated by the joint portions 64 to be readily transferred to the housing 14. Thus, the heat generated by the joint portions 64 is efficiently dissipated to the housing 14. This further improves the heat dissipation of the conductor 60. In addition, the joint portions 64 are prevented from limiting heat dissipation from the second metal plate 62 to the housing 14.

(5) The second metal plate 62 is made of a material having a higher thermal conductivity than that of the first metal plate 61 in the above-described embodiment. For instance, a case will now be considered comparing the above-described embodiment with a comparative case in which the second metal plate 62 is made of a material with the same heat transfer coefficient as the first metal plate 61, or made of a material with a lower heat transfer coefficient than the first metal plate 61. As compared to the comparative case, the configuration of the above-described embodiment further efficiently dissipates the heat generated by the second metal plate 62 to the housing 14.

Modifications

The above-described embodiment may be modified as follows. The above-described embodiment and the following modifications can be combined as long as the combined modifications remain technically consistent with each other.

In the above-described embodiment, the second metal plate 62 may be made of a material with the same heat transfer coefficient as the first metal plate 61, or made of a material with a lower heat transfer coefficient than the first metal plate 61.

In the above-described embodiment, for example, the distal end face of each extending portion 62b may be thermally connected to the mounting surface 54 of the housing 14.

In the above-described embodiment, for example, the distal end of each extending portion 62b may be bent along the mounting surface 54. The bent part may be thermally connected to the mounting surface 54.

In the above-described embodiment, the first metal plate 61 does not necessarily need to include the two upright portions 61b. The two extending portions 62b may be joined to opposite ends of the first metal plate main body 61a so that the two extending portions 62b are electrically connected to the first metal plate 61.

In the above-described embodiment, the joint portions 64 may be located outside of the recesses 55.

In the above-described embodiment, the extending portions 62b and the upright portions 61b may be joined to each other by, for example, soldering. Accordingly, the joint portions 64 may be parts at which the extending portions 62b and the upright portions 61b are soldered to each other.

In the above-described embodiment, the extending portions 62b and the upright portions 61b may be in direct contact with the inner surfaces of the recesses 55. In other words, any configuration may be employed as long as the extending portions 62b and the upright portions 61b are inserted into the recesses 55 and are thermally connected to the inner surfaces of the recesses 55.

In the above-described embodiment, through-holes may be formed in portions of the first metal plate main body 61a that overlap with the windings 51. Also, adhesive may be provided inside the through-holes to join the windings 51 to the mounting surface 54. In this case, the heat generated by the windings 51 is dissipated to the mounting surface 54 via the adhesive.

In the above-described embodiment, the shape of the core 50 is not particularly limited as long as it is annular.

In the above-described embodiment, the width of the first metal plate main body 61a does not necessarily need to be the same as the width of the upright portions 61b, but may be different.

In the above-described embodiment, the width of the second metal plate main body 62a does not necessarily need to be the same as the width of the extending portions 62b, but may be different.

In the above-described embodiment, the housing 14 is configured such that the portion that accommodates the inverter device 30 and the portion that accommodates the compression unit 18 and the motor 19 are integrated. However, additional housings may be provided so that these portions are separated from each other.

In the above-described embodiment, the compression unit 18 is not limited to a scroll type, but may be, for example, a piston type or a vane type.

In the above-described embodiment, the motor-driven compressor 11 is used in the vehicle air conditioner 10. However, the present disclosure is not limited to this. For example, the motor-driven compressor 11 may be mounted on a fuel cell electric vehicle and use the compression unit 18 to compress air that is a fluid supplied to the fuel cell.

The term "annular" as used in this description may refer to any structure that forms a loop, which is a continuous shape with no ends. "Annular" shapes include but are not limited to a circular shape, an elliptic shape, and a polygonal shape with sharp or rounded corners.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A motor-driven compressor, comprising:
a compression unit configured to compress a fluid;
a motor configured to drive the compression unit; and
an inverter device accommodated in a metal housing, the inverter device being configured to drive the motor, wherein
the inverter device includes:
an inverter circuit configured to convert DC power to AC power;
a noise reducing unit that is provided on an input side of the inverter circuit and is configured to reduce common-mode noise and normal-mode noise included in the DC power before the DC power is supplied to the inverter circuit; and a circuit board on which the inverter circuit and the noise reducing unit are mounted, the noise reducing unit includes:

a common mode choke coil; and a smoothing capacitor that forms a low-pass filter together with the common mode choke coil, the common mode choke coil includes:

an annular core;

two windings wound around the core; and an annular conductor that covers both of the two windings, the conductor is divided into a first metal plate and a second metal plate, the first metal plate and the second metal plate are combined to form an annular shape such that induced current flows in a circumferential direction of the conductor so as to hinder changes in leakage magnetic flux from the core, the circuit board is disposed on an opposite side of the common mode choke coil from the housing, the second metal plate includes:

a main body disposed on an opposite side of the two windings from the first metal plate; and two extending portions that extend from the main body toward the housing, the second metal plate is thermally connected to the housing, the first metal plate is thermally connected to the second metal plate, and at least one of an electrical resistance value or a thermal resistance value in a current path of the induced current is lower in the second metal plate than in the first metal plate.

2. The motor-driven compressor according to claim 1, wherein the housing includes two recesses, and distal ends of the extending portions are respectively inserted into the recesses.

3. The motor-driven compressor according to claim 2, wherein the first metal plate includes two upright portions that extend toward the housing, the upright portions are respectively inserted into the recesses and are thermally connected to the housing.

4. The motor-driven compressor according to claim 3, wherein the conductor includes joint portions, each of which provides a metal-to-metal joint between the distal end of each extending portion and the corresponding upright portion, and the joint portions are respectively disposed inside the recesses and are thermally connected to the housing.

* * * * *